(12) United States Patent
Reitemeyer et al.

(10) Patent No.: US 8,782,915 B2
(45) Date of Patent: Jul. 22, 2014

(54) METHOD AND DEVICE FOR MEASURING A SURFACE PROFILE

(75) Inventors: Matthias Reitemeyer, Göttingen (DE); Heinz-Joachim Kedziora, Göttingen (DE)

(73) Assignee: Carl Mahr Holding GmbH, Göttingen (DE)

( * ) Notice: Subject to any disclaimer, the term of this patent is extended or adjusted under 35 U.S.C. 154(b) by 323 days.

(21) Appl. No.: 13/373,143

(22) Filed: Nov. 4, 2011

(65) Prior Publication Data

US 2012/0096728 A1 Apr. 26, 2012

Related U.S. Application Data

(63) Continuation-in-part of application No. PCT/EP2010/054892, filed on Apr. 14, 2010.

(30) Foreign Application Priority Data

May 7, 2009 (DE) .......................... 10 2009 020 294

(51) Int. Cl.
*G01B 5/20* (2006.01)
(52) U.S. Cl.
USPC .............................................. 33/559; 33/556
(58) Field of Classification Search
USPC .......................................... 33/556, 559, 503
See application file for complete search history.

(56) References Cited

U.S. PATENT DOCUMENTS

| | | | |
|---|---|---|---|
| 4,669,300 A | 6/1987 | Hall et al. | |
| 5,471,406 A | 11/1995 | Breyer et al. | |
| 5,705,741 A | 1/1998 | Eaton et al. | |
| 6,434,851 B1* | 8/2002 | Nishina | 33/559 |
| 6,604,295 B2* | 8/2003 | Nishimura et al. | 33/554 |
| 7,367,132 B2* | 5/2008 | Mitsuhashi | 33/556 |
| 7,784,333 B2* | 8/2010 | Nemoto et al. | 73/105 |
| 7,788,820 B2* | 9/2010 | Aubele et al. | 33/556 |
| 7,913,412 B2* | 3/2011 | Xia | 33/559 |

(Continued)

FOREIGN PATENT DOCUMENTS

| | | |
|---|---|---|
| DE | 42 12 455 A1 | 10/1993 |
| DE | WO 94/12850 | 6/1994 |

(Continued)

OTHER PUBLICATIONS

DE 31 06 031 A1—Date—Dec. 3, 1981; Country—Germany; Translation—No.

(Continued)

*Primary Examiner* — Yaritza Guadalupe-McCall
(74) *Attorney, Agent, or Firm* — R. S. Lombard; K. Bach

(57) ABSTRACT

A measuring device (10) and method for measuring a surface profile of a workpiece. A measuring carriage (15) is moved in a straight line at a distance from the workpiece surface in a moving direction (x), without accelerating a carried probe tip (25). The free probe end (40) of the probe tip (25) rests on the workpiece surface (11) with a measuring force ($F_m$) and is deflected during the measurement in a measuring direction (z), transverse to moving direction (x), the surface profile causes a track-dependent deflection ($z_T$) of the probe end (49). A measured value receiver (45) detects the deflecting value (s) describing the deflection of the probe end (40) in measuring direction (z). In an analyzing unit (21), a measuring force change value describing the change of the measuring force ($F_m$) between the probe end (40) and the workpiece surface (11) is formed for detecting measuring errors/inaccuracies.

18 Claims, 1 Drawing Sheet

(56) References Cited

U.S. PATENT DOCUMENTS

| | | | |
|---|---|---|---|
| 7,950,164 B2* | 5/2011 | Nakayama et al. | 33/556 |
| 8,006,402 B2* | 8/2011 | Yoshizumi et al. | 33/556 |
| 2005/0204573 A1* | 9/2005 | Kassai et al. | 33/559 |
| 2006/0117587 A1* | 6/2006 | Lotze | 33/559 |
| 2009/0300930 A1* | 12/2009 | Ishikawa | 33/559 |
| 2010/0212174 A1* | 8/2010 | Xia | 33/559 |
| 2011/0232118 A1* | 9/2011 | Hon et al. | 33/559 |
| 2012/0096728 A1* | 4/2012 | Reitemeyer et al. | 33/559 |

FOREIGN PATENT DOCUMENTS

| | | |
|---|---|---|
| DE | 196 17 022 C1 | 12/1997 |
| DE | 196 41 720 A1 | 4/1998 |
| DE | 197 53 303 A1 | 6/1998 |
| DE | 199 41 899 A1 | 3/2000 |
| DE | 102 58 579 A1 | 8/2004 |
| DE | 10 2005 035 785 B3 | 4/2007 |

OTHER PUBLICATIONS

DE 42 18 753 A1—Date—Dec. 9, 1993; Country—Germany; Translation—No.

DE 40 13 742 A1—Date—Oct. 31, 1991; Country—Germany; Translation—No.

* cited by examiner

METHOD AND DEVICE FOR MEASURING A SURFACE PROFILE

CROSS-REFERENCE TO RELATED APPLICATION

This is a continuation-in-part application of pending international application PCT/EP2010/054892 filed Apr. 14, 2010 and claiming the priority of German Application No. 10 2009 020 294.3 filed May 7, 2009.

BACKGROUND OF THE INVENTION

The invention relates to a measuring device and a method for measuring a surface profile of a workpiece.

A so-called coordinate measuring device has been known from publication DE 197 53 303 A1. In this case, a scanning stylus that can be moved in three spatial directions on a scanning head is moved over the surface of the workpiece that is to be measured. In doing so, the scanning head moves along a trajectory that is determined based on the target contour over which the scanning stylus is to be moved. The target contour may be prespecified, for example, by dot sequences and associate normal vectors. By moving the scanning head along the trajectory, a centrifugal force is applied to the scanning stylus, said force affecting the measuring result when the scanning stylus deflections are being detected. For this reason, the trajectory acceleration of the scanning head is determined, and the resultant force that accelerates the scanning stylus is being calculated. This force can be used for the correction of the target measuring force that is desired between the scanning stylus and the workpiece surface.

In this method, it is necessary that the shape of the profile curve of the workpiece surface be at least known approximately in order to be able to adjust the trajectory of the scanning head.

Consequently, it can be considered an object of the present invention to provide an improved measuring device and improved measuring method, respectively.

SUMMARY OF THE INVENTION

The invention relates to a measuring device (10) for measuring a surface profile of a workpiece and to a corresponding measuring method. During measurement, a measuring carriage (15) is moved in a straight line at a distance from the workpiece surface in a moving direction (x), so that the probe tip (25) provided on said measuring device is not accelerated due to the movement of the measuring carriage (15). The free probe end (40) of the probe tip (25) rests on the workpiece surface (11) with a measuring force ($F_m$) and is deflected during the measurement in a measuring direction (z), said direction being transverse to moving direction (x), so that the surface profile causes a track-dependent deflection ($z_T$) of the probe end (49). A measured value receiver (45) detects the deflecting value (s) describing the deflection of the probe end (40) in measuring direction (z). In an analyzing unit (21), a measuring force change value describing the change of the measuring force ($F_m$) between the probe end (40) and the workpiece surface (11) is formed as a function of the deflecting value (s). Measuring errors or measuring inaccuracies can be detected with the measuring force change value.

The measuring device in accordance with the invention comprises a measuring carriage that is being moved by means of a carriage drive in a straight line along an axis in the direction of movement during the measurement. The measuring carriage can only be moved in moving direction along one axis. A probe tip is provided on the measuring carriage, the free probe end of said probe tip resting on the workpiece surface with a measuring force. An acceleration of the probe tip in a measuring direction by moving the measuring carriage does not occur during the measurement. During the measurement, the probe end is moved in the direction of movement across the workpiece surface and, in doing so, deflected transversely thereto in a measuring direction. A measured value receiver detects the deflection of the probe end and generates a track-dependent deflecting value. The deflecting value describes the surface profile of the workpiece. An analyzing unit uses the deflecting value to determine a measuring force change value that indicates the change of the measuring force between the probe end and the workpiece surface. In this way, the surface-dependent measuring force change is determined. As a result of this, measuring errors potentially arising from the acceleration of the probe end can be avoided, said measuring errors being due to the profile shape of the workpiece surface. With too low a measuring force the probe end may lift off the workpiece surface, whereas with too great a measuring force elastic deformations may occur on parts of the measuring device, e.g., the probe tip. In both cases, the measuring result will be impaired. With the use of this measuring device or the measuring method performed therewith, it is possible to achieve highly accurate measurements of the surface profile.

Advantageous embodiments of the invention are obvious from the dependent claims.

Considering a preferred embodiment, the measuring device is designed for a measuring range of approximately 10 mm (millimeter) in measuring direction, so that workpieces having a maximum profile height difference of the workpiece surface of approximately 10 mm can be measured. Profile changes of the workpiece surface in the nanometer range can be detected, for example, as of approximately 6 nm.

Advantageously, the analyzing unit determines the change of the measuring force as a function of the gradient change of the deflecting value. For example, the second time deviation of the deflecting value can be used for the determination of the change of the measuring force value. The second time deviation of the deflecting value is directly proportional to the measuring force change value, which value can be determined very simply as a result of this. In doing so, the proportionality factor is generated by the mass or the mass moment of inertia of the components of the measuring device that are being moved when the probe tip is being deflected.

Furthermore, it is advantageous if the analyzing unit is provided with a prespecified measuring force target range for the measuring force value, whereby an exact measurement can occur within said range. In particular, the measuring force target range should indicate an upper limit of the measuring force that, when exceeded, results in measuring errors due to the elastic deformation of the probe tip and the other components that are being moved by the probe tip, on the one hand, and that potentially also causes damage to the workpiece surface, on the other hand. It is also possible to indicate a lower limit of the measuring force that results in measuring errors when it is not reached because the probe end of the probe tip is no longer in sufficient contact with the workpiece surface. A target measuring force indicates the desired measuring force between the probe end and the workpiece surface and is within the measuring force target range.

In this case, it is preferable that an operator interface connected with the analyzing unit be provided, by means of which operator interface the measuring force target range can be prespecified and/or varied by an operator. The measuring parameters of the measuring device can be very easily changed via such an operator interface. In particular, it is possible to adapt the measuring force target range and/or the target measuring force to the properties of the workpiece surface to be measured, said properties being, in particular, its hardness or elasticity, to the elastic properties of the measuring device, in particular the probe tip, i.e., the geometric configuration of the probe tip.

Considering a preferred embodiment, the analyzing unit generates a measuring error signal when the measuring force value is outside the measuring force target range. When a measuring error signal occurs, it is possible for an operator to manually, or also automatically, initiate a measure.

The measuring error signal, may indicate, for example, that the probe end has lifted off the workpiece surface and/or that a measuring force is too high between the probe end and the workpiece surface, depending on whether an upper limiting value of the measuring force target range was exceeded or a lower limiting value of the measuring force target range was not reached. Subsequently, it is possible to perform another automatic or manual measurement with correspondingly changed measuring parameters, specifically, with an adapted carriage velocity.

In a preferred exemplary embodiment, measuring error information can be issued as a measure to the operator when a measuring error signal has occurred. This can be accomplished, for example, by an operator interface that is being activated by the analyzing unit. Measuring error information can be issued visually or acoustically. It is particularly useful if the measuring error information contains a text that provides the operator with instructions for troubleshooting the error and for the additional measurement. Preferably, the measuring error information contains data regarding an adapted carriage velocity for any further measurement.

It is also possible, when a measuring error signal is present, for the analyzing unit to initiate another measurement of the faultily measured surface profile section. To accomplish this, the analyzing unit can activate the carriage drive so that the measuring carriage will be moved back up to at least the carriage position in which the last error-free measured value of the deflecting value was available.

Furthermore, it is advantageous if a force setting device that can be activated by the analyzing unit is provided, said force setting device generating a previously specifiable static contact force between the probe end and the workpiece surface. With the aid of this force setting device, it is possible to vary the static contact force, in particular as a function of the determined surface-dependent measuring force change. In particular, the analyzing unit can initiate an adaptation of the static contact force when a measuring error signal is present. The static contact force can be varied for an adaptation of the actual measuring force to the target measuring force. For example, a linear drive can be used as the force setting device.

Consequently, considering the invention, it is possible to manually or automatically reduce the carriage velocity and/or increase the static contact force if the probe end is lifting off. If the measuring force is too great, the carriage velocity and/or the static contact force are reduced manually or automatically.

During measurement, it is possible to constantly specify the carriage velocity of the measuring carriage. As a result of this, there are also no accelerating forces acting on the probe tip in the direction of movement. Alternatively, is also possible to pre-specify the carriage velocity of the measuring carriage as a function of a parameter while measuring takes place. In particular, it is possible for the carriage velocity to be a function of the deflecting value. Considering this modification, it is possible to maintain the velocity of the probe tip constant relative to the workpiece surface.

BRIEF DESCRIPTION OF THE DRAWINGS

Additional details of embodiments of the invention are implicit in the description, the drawings or the claims hereinafter. The description is restricted to essential details of the embodiments of the invention and to miscellaneous situations. The drawings disclose additional details and are to be used for supplementary reference. They show in:

DETAILED DESCRIPTION OF VARIOUS EMBODIMENTS

Figure 1:
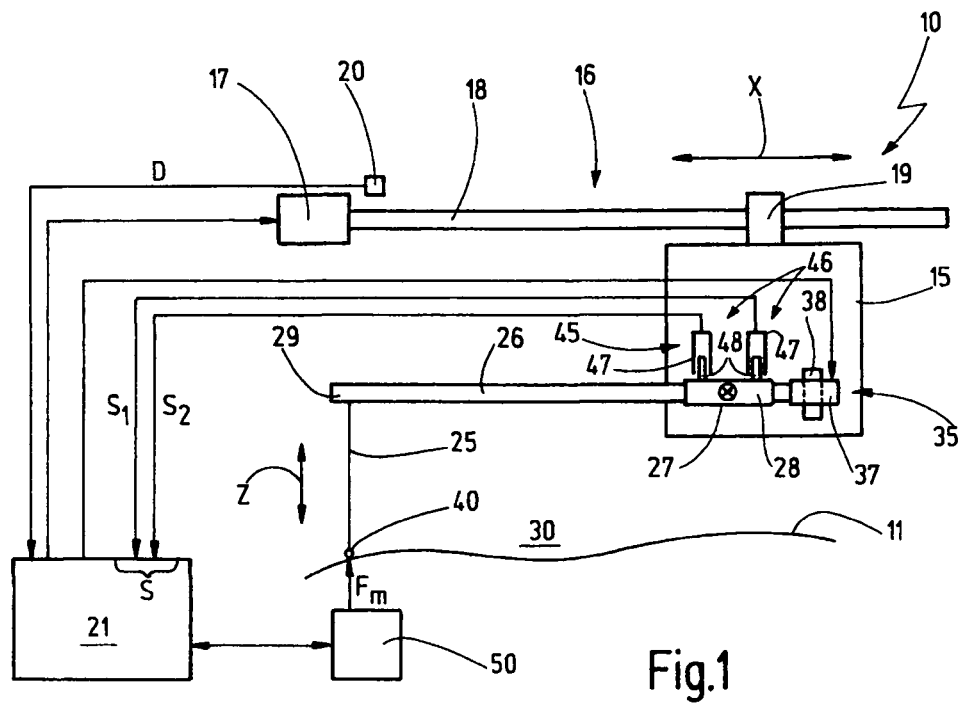
FIG. 1 a schematic representation, similar to a block circuit diagram, of an exemplary embodiment of a measuring device, and FIG. 2 a schematically depicted, exemplary shape of a curve of a measuring force during a measurement.

FIG. 1 shows a preferred embodiment of a measuring device 10, schematically depicted in a manner similar to a block circuit diagram. The measuring device 10 is used for measuring a surface profile of a surface 11 of a workpiece. The measuring device 10 shown by FIG. 1 is a so-called surface profiling device. Other forms of implementation of the measuring device 10 are also possible.

The measuring device 10 comprises a measuring carnage 15 that is guided by a carriage drive 16 and can be moved in a moving direction x. The carriage drive 16 comprises an electric driving motor 17 that can rotationally drive a spindle 18 so as to rotate in both directions of rotation, said spindle extending in moving direction x. The spindle 18 has a not specifically illustrated spindle thread on which is seated a spindle nut 19. The spindle nut 19 is rigidly connected with the measuring carriage 15. While the spindle 18 is rotating, the spindle nut 19 and the measuring carriage 15 fastened thereto move along the spindle 18 in moving direction x. A rotary angle sensor 20 detects the rotation of the spindle 18 and delivers the rotary angle value D to an analyzing unit 21. The analyzing unit 21 activates the driving motor 17 and is able to pre-specify the direction of rotation of said motor and also pre-specify the rotational speed of said motor. The position of the measuring carriage 15 of the analyzing unit 21 can be determined by way of the rotary angle value D.

A probe tip 25 is movably affixed to the measuring carriage 15. The probe tip 25 is directly affixed to the measuring carriage 15 via a probe arm 26. In its undeflected inoperative position, the probe arm 26 extends essentially in moving direction x away from the tracking carriage 15 and is supported by a rocker 28 on the tracking carriage 15 so as to be pivotable about a pivot axis 27. The probe tip 25 extends, on the end 29 of the probe arm 26 opposite the measuring carriage 15, in transverse direction and, in particular, at a right angle therefrom toward the measuring range 30, within which the workpiece is located. The probe tip 25 extends transversely to moving direction x, where the alignment of the probe tip 25 changes as a function of the pivoting position of the probe arm 26 about the pivot axis 27.

On one side of the pivot axis 27, the probe arm 26 is connected with the rocker 28, while, on the other side, the rocker 28 is connected with a force setting device 35. This force setting device is located on the measuring carriage 15. In accordance with the example, the force setting device 35 is configured as a linear drive and comprises a coil 37 that is rigidly connected with the rocker 28, said coil enclosing a magnet 38 in the form of a ring. The coil 37 can be activated by the analyzing unit 21. When current flows through the coil 37, a Lorentz force is generated, said force causing a torque about the pivot axis 27. Consequently, the force setting device 35 can initiate a static contact force $F_{stat}$ with which a probe end 40 of the probe tip 25 associated with the workpiece surface 11 is pressed onto the workpiece surface 11. The static contact force $F_{stat}$ can be varied via the analyzing unit 21.

A measured value receiver 45 is provided on the measuring carriage 15, said measuring receiver generating a deflecting value s that describes the deflection of the probe end 40 in a measuring direction z transverse to moving direction x and transverse to the pivot axis 27. In a preferred exemplary embodiment, the deflecting value s consists of two separate measured values $s_1$, $s_2$, that are detected independently of each other. Both measured values $s_1$, $s_2$ are output to the analyzing unit 21. It determines the deflection of the probe end 40 in measuring direction z, based on the deflecting value s delivered by the measured value receiver 45.

For example, the measured value receiver 45 comprises two independent measuring units 46 that, in the exemplary embodiment described here, are configured as inductive measuring units 46. Each of them comprises a coil 47 and a core 48 that can be moved relative to said coil. In the exemplary embodiment, the cores 48 are permanently connected with the rocker 28. When the rocker 28 performs a pivoting movement about the pivot axis 27, the cores 48 move relative to the respectively allocated measuring coil 47 and deliver the corresponding measured value $s_1$, $s_2$ to the analyzing unit 21. Alternatively, the coils 47 may also be connected with the rocker 28.

In accordance with the example, the measuring device 10 further comprises an operator interface 50 that is electrically connected with the analyzing unit 21. This connection is bidirectional, so that the analyzing unit 21 is able to output information via the operator interface 50 to the operator and, vice versa, the operator can convey input or defaults to the analyzing unit 21 via the operator interface 50.

For measuring the surface profile of a workpiece surface 11, the carriage drive 16 is activated, so that the measuring carriage 15 moves, for example at constant carriage velocity, in moving direction x at a distance from the workpiece surface 11. The probe end 40 of the probe tip 25 rests on the workpiece surface and is dragged by the probe carriage 15 over the workpiece surface 11. Alternatively, it is also possible to vary the carriage velocity as a function of a parameter. For example, the parameter that is used may be the deflection or the degree of the pivoting motion of the probe arm 26. As a result of this, the velocity of the probe end 40 relative to the workpiece surface may be maintained constant, for example.

Depending on the surface profile shape—when the probe end 40 is dragged over the workpiece surface—the probe end 40 moves up or down in measuring direction z, thereby pivoting the probe arm 26 and the rocker 28, respectively, about the pivot axis 27. The pivoting motion is detected by means of the measured value receiver 46 and a corresponding deflecting value s is delivered to the analyzing unit 21. The analyzing unit 21 can use the deflecting value s to calculate the shape of the surface profile. In doing so, the analyzing unit 21 activates the force setting device 35 in order to generate a static contact force $F_{stat}$ between the probe end 40 and the workpiece surface 11. As long as the workpiece surface 11 is in plane and extends parallel to moving direction x, the measuring force $F_m$ that actually occurs between the workpiece surface 11 and the probe end 40 corresponds to the static contact force $F_{stat}$. However, if accelerations of the probe end 40 occur in measuring direction z due to the surface profile of the workpiece surface 11, the measuring force $F_m$ changes.

The deflecting value s is used to determine the measuring force change in the analyzing unit 21, said measuring force change being a function of the surface profile. Depending on the deflecting direction of the probe end 40 in measuring direction z, the measuring force $F_m$ increases or decreases relative to the static contact force $F_{stat}$ that is generated by the force setting device 35.

In the preferred exemplary embodiment, the deflecting value s is used to calculate the actual deflection $z_T$. The acceleration $a_T$ can be determined, in particular, by twice deriving the deflection $z_T$ of the probe end 40 over time t in measuring direction z. This acceleration $a_T$ is due only to the surface profile of the workpiece surface 11. The acceleration $a_T$ is proportional to a dynamic force $F_{dyn}$ that represents a measuring force change value $F_{dyn}$, said change value describing the measuring force $F_m$. The determined acceleration $a_T$ of the probe end 40 and the mass moment of inertia or mass of the accelerated components 25, 26, 37, 48 of the measuring device 10 can be used to calculate the dynamic force $F_{dyn}$. Thus, the measuring force $F_m$ that actually exists between the probe end 40 and the workpiece surface 11 results from the sum of the static contact force $F_{stat}$ plus the dynamic force $F_{dyn}$.

In the analyzing unit 21, a measuring force target range for the measuring force value $F_m$ has been pre-specified, said range being between a lower limiting value $F_u$ and an upper limiting value $F_o$. The desired target measuring force $F_{soll}$ within this measuring force target range is located between the probe end 40 and the workpiece surface 11. The measuring force target range or its limiting values $F_u$, $F_o$ can be pre-specified and varied by the operator via the operator interface 50. Depending on the workpiece to be measured, the operator can state the desired values. Furthermore, it is also possible to pre-specify or adapt other measuring parameters such as, for example, the carriage velocity $v_x$ or the target measuring force and thus the static contact force $F_{stat}$.

During the measurement, the dynamic force $F_{dyn}$ and, in turn based on this, the actual measuring force $F_m$ are calculated in the analyzing unit 21. If the actual measuring force $F_m$ exceeds the upper limiting value $F_o$, a measuring error signal is generated. In this case, the actual measuring force is too great so that measuring errors can occur due to the elastic stress on the probe tip 25 or on the probe arm 26. The analyzing unit 21 also triggers a measuring error signal when the actual measuring force $F_m$ is below the lower limiting value $F_u$. In this case, the measuring force between the probe end 40 and the workpiece surface 11 is too low and a secure contact is not reliably ensured. Therefore, this measurement can be flawed. In this manner, it is possible to detect when a measuring force $F_m$ is too great and also when the probe end lifts off the workpiece surface 11.

Figure 2:
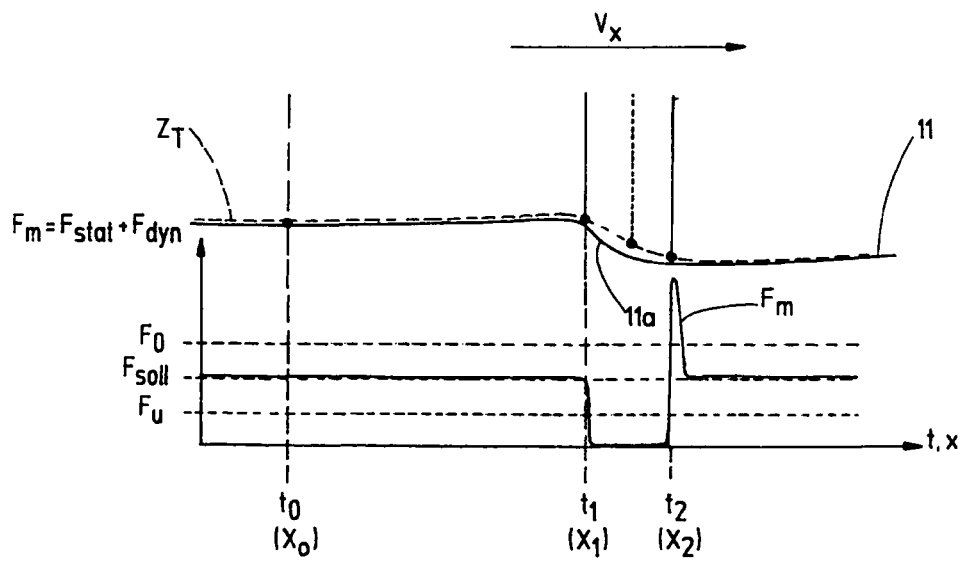

FIG. 2 shows a schematic measurement as an example, where the diagram shows the measuring force $F_m$ over time t or the path of the probe end 40 in moving direction x. The measuring carriage 15, in accordance with the example, moves at constant carriage velocity $v_x$. At a first point in time $t_o$ the measuring force $F_m$ approximately corresponds to the desired target force and thus the static contact force $F_{stat}$. At a second point in time $t_1$ the probe end 40 reaches a descending section 11a or a rebound of the workpiece surface 11. Inasmuch as the carriage velocity $v_x$ is assumed to be too great in the example, the probe end 40 lifts off the workpiece surface 11 and the measuring force $F_m$ does not fall below the lower limiting value $F_u$ and decreases approximately to 0. The probe end 40 is pushed back into the direction of the workpiece surface 11 due to the static contact pressure $F_{stat}$ and comes again into contact with the workpiece surface at a third point in time $t_2$. When the probe end 40 impinges on the workpiece surface 11, the measuring force $F_m$ increases steeply and exceeds the upper limiting value $F_o$. Immediately after the third point in time $t_2$ the measuring force $F_m$ again decreases to the desired measuring force target value to which the static contact force $F_{stat}$ is adapted if there exists no dynamic force $F_{dyn}$.

If the measuring force $F_m$ moves outside the measuring force target range determined in the analyzing unit 21, a measuring error signal is generated by the analyzing unit 21. In a first modification of the embodiment, the measuring error signal can be delivered to the operator interface 50, as a result of which corresponding measuring error information is output to the operator, said information being in the form of a visual signal, a text information on the display, an acoustic signal or any desired combination of said information options. In doing so, the text information may contain instructions for the operator indicating that a flawed measurement exists and that the measurement is to be repeated with adapted measuring parameters. Via the analyzing unit 21, it is possible—for output to the operator—to deliver to the operator interface 50 modified measuring parameters such as, for example, a changed static contact force $F_{stat}$ and/or a changed carriage velocity $v_x$, in order to enable the operator to perform another, and thus error-free, measurement.

Alternatively or additionally, it is also possible to provide an automatic error correction, in which case the analyzing unit 21 automatically performs a renewed error-free measurement when an error message exists.

For automatic error correction, the analyzing unit 21 in the preferred embodiment moves the measuring carriage 15 back to the carriage position in which the last error-free measured value of the deflecting value s existed. Alternatively, the measuring carriage 15 could also be moved back into its home position. Depending on the error that has occurred, the analyzing unit 21 initiates a reduction of the carriage velocity $v_x$ and/or an adaptation of the static contact force $F_{stat}$. The driving motor 17 or the force setting device 35 are activated accordingly. Referring to the example shown by FIG. 2, the measuring carriage 15 would be moved back to a location at which the probe end 40 rests on the workpiece surface 11 prior to reaching the section 11$a$. Subsequently, another measurement can be performed with reduced carriage velocity $v_x$, thus preventing the probe end 40 from lifting off the workpiece surface 11.

If, during a measurement, it is too great a measuring force $F_m$, instead of a not lifted off probe end 40, that has occurred, the analyzing unit 21 can automatically reduce the static contact force $F_{stat}$ and repeat the measurement.

With the knowledge of the once determined surface profile, the analyzing unit 21 is able to determine optimal measuring parameters for future measurements, said measurements allowing the measurement of the surface profile in an error-free manner and, at the same time, at the greatest possible speed. In doing so, the carriage velocity $v_x$ is selected as great as possible, without exceeding the upper limiting value $F_o$ and without falling below the lower limiting value $F_u$ of the measuring force target range. Inasmuch as the dynamic force $F_{dyn}$ can be calculated based on the known surface profile 11, the measuring force $F_m$ is known to the analyzing unit 21 at any point of the surface profile. The static contact force $F_{stat}$, as well as the carriage velocity $v_x$, can be adjusted by the analyzing unit 21 in such a manner that an error-free measurement is possible in the shortest possible time.

The invention relates to a measuring device 10 for measuring a surface profile of a workpiece and to a corresponding measuring method. During measurement, a measuring carriage 15 is moved in a straight line at a distance from the workpiece surface in a moving direction x, so that the probe tip 25 provided on said measuring device is not accelerated due to the movement of the measuring carriage 15. The free probe end 40 of the probe tip 25 rests on the workpiece surface 11 with a measuring force $F_m$ and is deflected during the measurement in a measuring direction z, said direction being transverse to moving direction x, so that the surface profile causes a track-dependent deflection $z_T$ of the probe end 40. A measured value receiver 45 detects the deflecting value s describing the deflection $z_T$ of the probe end 40 in measuring direction z. In an analyzing unit 21, a measuring force change value $F_{dyn}$ describing the change of the measuring force $F_m$ between the probe end 40 and the workpiece surface 11 is formed as a function of the deflecting value s. Measuring errors or measuring inaccuracies can be detected with the measuring force change value $F_{dyn}$.

What is claimed is:

1. Measuring device (10) for measuring a surface profile of a workpiece, said device comprising,
    a measuring carriage (15) having a plurality of carriage positions, the measuring carriage (15) during measurement carried by and movable via a carriage drive (16) in a straight line at a distance from the workpiece surface in a moving direction (x),
    a probe tip (25) provided on the measuring carriage (15), a free probe end (40) of said probe tip (25) in operative position resting on the workpiece surface (11) to be measured with a measuring force ($F_m$) and the free probe end (40) being deflectable in a measuring direction (z) transverse to the moving direction (x)
    a measured value receiver (45) in operative arrangement with the probe tip (25) and for detecting a deflecting value (s) describing a deflection ($z_T$) of the probe end (40) in the measuring direction (z),
    an analyzing unit (21) in operative arrangement with the carriage drive (16) and the measured value receiver (45), the analyzing unit (21) for determining a measuring force change value ($F_{dyn}$) describing the change of the measuring force ($F_m$) between the probe end (40) and the workpiece surface (11) as a function of the deflecting value (s), the analyzing unit (21) is provided with a pre-specified measuring force target range ($F_o$, $F_u$) for the measuring force value ($F_m$), whereby an exact measurement can occur within said range, the analyzing unit (21) for generating a measuring error signal when the measuring for value ($F_m$) is outside the measuring force target range ($F_o$, $F_u$), and,
    the measuring error signal for indicating that the probe end (40) has lifted off the workpiece surface (11) and/or that a measuring force ($F_m$) is too high between the probe end (40) and the workpiece surface (11).

2. Measuring device as in claim 1, further characterized by the analyzing unit (21) for calculating the deflection ($z_T$) from the deflection value (s) and for determining the acceleration ($a_T$) of the probe end (40) in measuring direction (z) based on the deflection ($z_T$) and for determining the measuring force change value ($F_{dyn}$), whereby the measuring force change value ($F_{dyn}$) corresponds to the difference between the measuring force ($F_m$) and the static force (Fstat).

3. Measuring device as in claim 1, further characterized by an operator interface (50) operatively connected with the analyzing unit (21) is provided, the operator interface (50) for pre-specifying and/or varying by an operator the measuring force target range ($F_o$, $F_u$).

4. Measuring device as in claim 1, further characterized by an operator interface (50) that that can be activated by the analyzing unit (21) is provided, said analyzing unit (21) for issuing measuring error information to the operator interface (50) when the measuring error signal is present.

5. Measuring device as in claim 4, further characterized by the measuring error information of the analyzing unit (21) contains a changed carriage velocity ($v_x$) that can be set by the operator for a repeat measurement.

6. Measuring device as in claim 1, further characterized by the analyzing unit (21) for activating the carriage drive (16) when a measuring error signal is present in order to move the measuring carriage (15) back up to at least the carriage position in which the last error-free measured value of the deflecting value (s) was available.

7. Measuring device as in claim 1, further characterized by, when the measuring error signal is present, the analyzing unit (21) for adapting the carriage velocity ($v_x$) of the carriage drive (16) for further measurement.

8. Measuring device as in claim 1, further characterized by, during measurement, the carriage drive (16) for moving the measuring carriage (15) in a uniform manner at constant carriage velocity.

9. Measuring device as in claim 1, further characterized by, during measurement, the carriage drive (16) for moving the measuring carriage (15) at a parameter-dependent pre-specified carriage velocity, in particular at a carriage velocity that is a function of the deflecting value (s).

10. Measuring device as in claim 1, further characterized by the probe tip (25) is movably affixed to a probe arm (26) affixed to the measuring carriage (15), the probe arm (26) is supported by a rocker (28) on the measuring carriage (15), the probe arm (26) is pivotable about a pivot axis (27), the probe arm (25) extends transversely to the moving direction (x) of the measuring carriage (15) whereby the alignment of the probe tip (25) changes as a function of the pivoting position of the probe arm (26) about the pivot axis (27).

11. Measuring device as in claim 10, further characterized by the pivot arm (26) is operatively connected to one side of the rocker (28) while the rocker (28) is operatively connected to a force setting device (35).

12. Measuring device as in claim 11, further characterized by the force setting device (35) is connected in circuit with the analyzing unit (21).

13. Measuring device as in claim 11, further characterized by the measured value receiver (45) comprises two inductive measuring units (46), each inductive measuring unit (46) comprises a coil (47) and a core (48) that can be moved relative to the coil (47), the core (48) of each inductive measuring unit (46) is permanently slidably connected with rocker (28), whereby when rocker (28) performs a pivoting motion about pivot axis (27) each of the cores (48) move relative to the respectively allocated measuring coil (47) and deliver the corresponding measured value $s_1$, $s_2$ to the analyzing unit (21).

14. A method for measuring a surface profile of a workpiece, said method comprising the following steps:
    during measurement, a measuring carriage (15) is moved in a straight line at a distance from the workpiece surface (11) in a moving direction (x);
    a free probe end (40) of a probe tip (25) fastened to the measuring carriage (15) rests on the workpiece surface (11) to be measured with a measuring force ($F_m$) and glides over the workpiece surface (11) along moving direction (x);
    a deflecting value (s) is detected, said deflecting value describing the deflection ($z_T$) of the probe end (40) in a measuring direction (z) extending transversely to moving direction (x); and,
    a measuring force change value ($F_{dyn}$) describing the actual change of the measuring force ($F_m$) between the probe end (40) and the workpiece surface (11) is determined independent of the deflecting value (s);
    providing a pre-specified measuring force target range ($F_o$, $F_u$) for the measuring force value ($F_m$), whereby an exact measurement can occur within said range; and,
    generating a previously specifiable static contact force ($F_{stat}$) between the probe end (40) and the workpiece surface (11).

15. The method for measuring a surface profile of a workpiece as in claim 14 further comprising the following steps:
    calculating the deflection ($z_T$) from the detecting value (s);
    determining the acceleration ($a_T$) of the probe end (40) in measuring direction (z) based on the deflection ($z_T$); and,
    determining the measuring force change value ($F_{dyn}$), whereby the measuring force change value ($F_{dyn}$) corresponds to the difference between the measuring force ($F_m$) and the static force ($F_{stat}$).

16. Measuring device (10) for measuring a surface profile of a workpiece, said device comprising,
    a measuring carriage (15) having a plurality of carriage positions, the measuring carriage (15) during measurement carried by and movable via a carriage drive (16) in a straight line at a distance from the workpiece surface in a moving direction (x),
    a probe tip (25) provided on the measuring carriage (15), a free probe end (40) of said probe tip (25) in operative position resting on the workpiece surface (11) to be measured with a measuring force ($F_m$) and the free probe end (40) being deflectable in a measuring direction (z) transverse to the moving direction (x),
    a measured value receiver (45) in operative arrangement with the probe tip (25) and for detecting a deflecting value (s) describing a deflection ($z_T$) of the probe end (40) in the measuring direction (z),
    an analyzing unit (21) in operative arrangement with the carriage drive (16) and the measured value receiver (45), the analyzing unit (21) for determining a measuring force change value ($F_{dyn}$) describing the change of the measuring force ($F_m$) between the probe end (40) and the workpiece surface (11) as a function of the deflecting value (s), the analyzing unit (21) is provided with a pre-specified measuring force target range ($F_o$, $F_u$) for the measuring force value ($F_m$), whereby an exact measurement can occur within said range, the analyzing unit (21) for generating a measuring error signal when the measuring force value ($F_m$) is outside the measuring force target range ($F_o$, $F_u$), and,
    a force setting device (35) that can be activated by the analyzing unit (21) is provided, said force setting device (35) for generating a previously specifiable static contact force ($F_{stat}$) between the probe end (40) and the workpiece surface (11).

17. Measuring device as in claim 16, further characterized by, when a measuring error signal is present, the analyzing unit (21) for activating the force setting device (35) for changing the static contact force ($F_{stat}$).

18. Measuring device as in claim 16, further characterized by the force setting device (35) is a linear drive.

* * * * *